United States Patent Office.

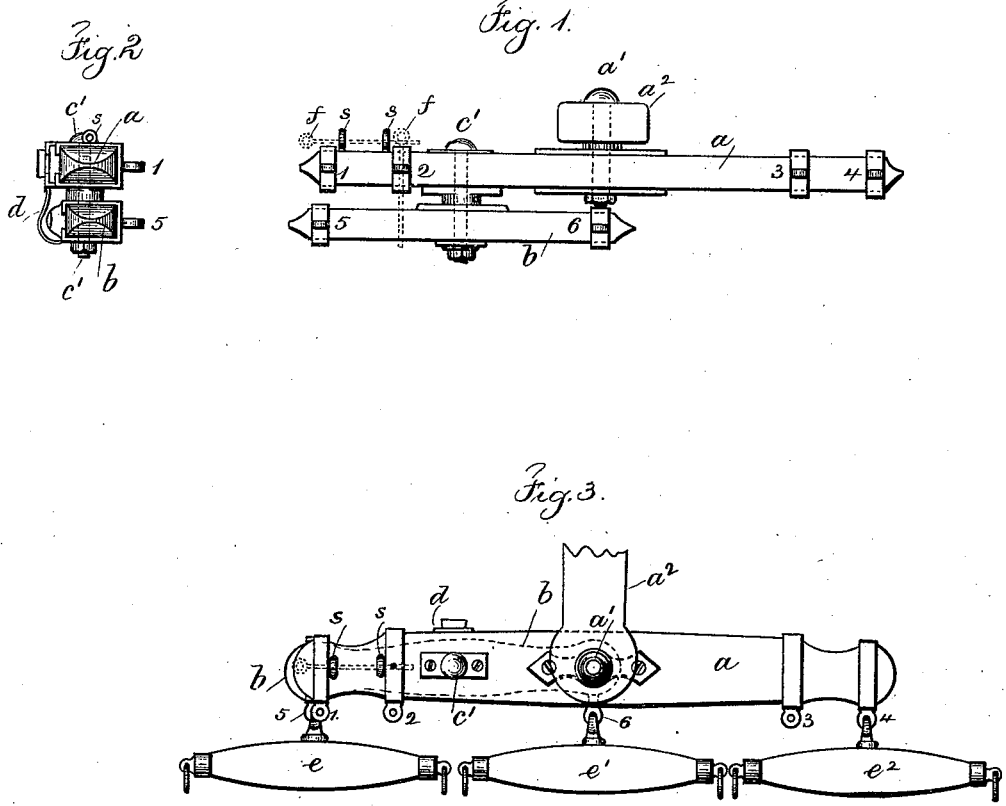

JOHN C. HULSEMANN, OF NEW YORK, N. Y.

DRAFT-EQUALIZER.

SPECIFICATION forming part of Letters Patent No. 303,390, dated August 12, 1884.

Application filed May 23, 1884. (No model.)

*To all whom it may concern:*

Be it known that I, JOHN C. HULSEMANN, of the city and State of New York, have invented an Improvement in Equalizers for Horses, of which the following is a specification.

Equalizers have been made for three horses in which the leverage is so proportioned that each horse has to pull its share of the load. In drawing heavy loads it is often important to be able to attach three horses, and at other times to use only two horses.

My invention is for facilitating the hitching up of either two or three horses to a load; and said invention consists in the combination of the devices hereinafter set forth.

In the drawings, Figure 1 is an elevation of the equalizer without the whiffletrees. Fig. 2 is an end view of the same, and Fig. 3 is a plan with three whiffletrees.

The main double-tree $a$ is to be connected by the bolt or pivot pin with the vehicle that is to be drawn. This pivot may be connected to a tongue-frame, $a^2$, or plates extending to the front axle or fifth-wheel. Upon this main double-tree $a$ there are straps and eyes 1 2 3 4, the eyes 1 and 4 being close to the ends, and the eyes 2 and 3 being at some little distance from the ends. By this mode of placing the eyes the whiffletrees of two horses can be attached to the eyes 1 and 4 or to 2 and 3. In the latter case the horses will be brought more closely together; and hence, for driving in cities, the team will occupy less space. If one horse is stronger than the other, the whiffletree of the strongest horse can be attached to 2 or 3 and of the weaker horse to 1 or 4.

In order to use this equalizer for three horses, I use the secondary double-tree $b$, attached to the double-tree $a$, half-way between the pivot $a'$ and the eye 1, and at the ends of this second double-tree $b$ there are straps and eyes 5 and 6.

When this equalizer is used for three horses, the whiffletrees $e$ $e'$ $e^2$ are connected by links, hooks, or eyes with the eyes or hooks 5 6 4, respectively, and the leverage of the one horse attached to $c^2$ is twice the amount of the leverage of the two horses attached to $e$ and $e'$, and acting upon the secondary double-tree $b$ and the pivot $c'$, by which such double-tree $b$ is connected with the double-tree $a$; hence the pull must be equal by each horse. The pivot-bolt $c'$ passes down through the double-tree $a$ and through the secondary double-tree $b$, there being the necessary projections or collars to keep the parts $a$ and $b$ separate. There may be a strap, $d$, passing down as a bracket behind the double-tree $a$, and aiding in supporting the pivot-pin $c'$ of the secondary double-tree $b$.

When the equalizer is in use with two horses, a pin, $f$, may be passed down through the double-tree $a$ and through the secondary double-tree $b$, to hold the latter from turning accidentally when not in use; and when the three horses are in use this pin $f$ may be held in the eyes $s$, in readiness for future use.

I claim as my invention—

1. The double-tree $a$, having the straps and eyes 1 2 3 4, in combination with the secondary double-tree $b$, with the eyes 5 and 6, and the pivot-pin $c'$, connecting the secondary double-tree $b$ to the double-tree $a$, substantially as set forth.

2. The combination, with the double-tree $a$, having the eyes 1 2 3 4, of the secondary double-tree $b$, pivot $c'$, and the movable pin $f$, passing through the double-trees, substantially as set forth.

Signed by me this 17th day of May, A. D. 1884.

JOHN C. HULSEMANN.

Witnesses:
   GEO. T. PINCKNEY,
   WILLIAM G. MOTT.